(12) United States Patent
Li

(10) Patent No.: US 7,089,500 B2
(45) Date of Patent: Aug. 8, 2006

(54) WIZARD USER INTERFACE PROVIDING INTERIM SYSTEM PRODUCT GENERATION AND REVERSION DURING WIZARD TRAVERSAL

(75) Inventor: Jin Li, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 10/205,551

(22) Filed: Jul. 25, 2002

(65) Prior Publication Data
US 2003/0048300 A1 Mar. 13, 2003

(30) Foreign Application Priority Data
Sep. 10, 2001 (CA) .................................... 2357160

(51) Int. Cl.
*G06F 3/00* (2006.01)
*G06F 3/14* (2006.01)
*G06F 9/455* (2006.01)

(52) U.S. Cl. ..................... 715/763; 715/765; 715/781

(58) Field of Classification Search ................ 715/705, 715/708, 744, 747, 762–765, 781, 810, 817–820, 715/829; 717/100, 104–111, 113, 116, 174
See application file for complete search history.

(56) References Cited

U.S. PATENT DOCUMENTS

| | | | |
|---|---|---|---|
| 5,859,637 A | 1/1999 | Tidwell, II | |
| 5,892,909 A | 4/1999 | Grasso et al. | |
| 5,924,101 A | 7/1999 | Bach et al. | |
| 6,053,951 A | 4/2000 | McDonald et al. | |
| 6,057,841 A | * 5/2000 | Thurlow et al. ............ 715/809 |
| 6,104,393 A | 8/2000 | Santos-Gomez | |
| 6,128,622 A | 10/2000 | Bach et al. | |
| 6,211,870 B1 | 4/2001 | Foster | |
| 6,219,046 B1 | 4/2001 | Thomas et al. | |
| 6,233,570 B1 | 5/2001 | Horvitz et al. | |
| 6,233,726 B1 | 5/2001 | Bowman et al. | |
| 6,237,135 B1 | 5/2001 | Timbol | |

(Continued)

OTHER PUBLICATIONS

Fawcette Technical Publications Oct. 1998, "Build Your First VB6 App Using Wizards", by J. Waldman, pp. 48-57.

(Continued)

*Primary Examiner*—Lucila X. Bautista
(74) *Attorney, Agent, or Firm*—Streets & Steele; Jeffrey L. Streets; Mark S. Walker

(57) ABSTRACT

A wizard user interface generates an interim system product during forward traversal of the wizard's pages and causes the generated interim system product to revert (i.e. be restored to a condition associated with a previous wizard page) during backward traversal of the wizard's pages. Advancing to a next page of the wizard causes a system product to be generated. The generated interim product is application dependent and may comprise one or more components, such as a generated electronic file or an amendment to an existing file for example, which are not merely by-products of the wizard mechanism. Backtracking to a previous wizard page causes the generated interim system product to revert. The wizard user interface allows observation of, and interaction with, the generated interim system product by the user prior to wizard completion.

41 Claims, 9 Drawing Sheets

U.S. PATENT DOCUMENTS

| | | | |
|---|---|---|---|
| 6,310,634 B1* | 10/2001 | Bodnar et al. | 715/854 |
| 6,378,128 B1* | 4/2002 | Edelstein et al. | 717/174 |
| 6,788,315 B1* | 9/2004 | Kekic et al. | 715/733 |
| 6,791,587 B1* | 9/2004 | Bamford et al. | 715/854 |
| 2001/0001851 A1 | 5/2001 | Piety et al. | |
| 2002/0118223 A1* | 8/2002 | Steichen et al. | 345/745 |
| 2002/0140731 A1* | 10/2002 | Subramaniam et al. | 345/762 |
| 2003/0197733 A1* | 10/2003 | Beauchamp et al. | 345/764 |

OTHER PUBLICATIONS

Research Disclosure Feb. 2001 No. 442, article 442149, "Method for monitoring, preventing and assisting user actions in a software user interface", p. 317.

Research Disclosure May 1999 No. 421, artilce 42182, "Managing Classes and Interfaces of an Enterprise JavaBean Component", pp. 668-669.

* cited by examiner

WIZARD USER INTERFACE PROVIDING INTERIM SYSTEM PRODUCT GENERATION AND REVERSION DURING WIZARD TRAVERSAL

FIELD OF THE INVENTION

The present invention relates to the field of software user interfaces, and more particularly to wizard software user interfaces.

BACKGROUND OF THE INVENTION

Contemporary computer systems employ various user interface (UI) mechanisms to facilitate data entry. One commonly utilised UI mechanism is the wizard. Wizards are typically employed when a data entry task lends itself to being broken down into a series of steps in order to improve the comprehensibility of the data entry task (e.g. when data to be entered by a user is deemed too confusing for entry by way of a single screen).

A wizard is a series of dialog boxes or "pages" that is presented in a particular sequence. Each page of the wizard corresponds to a step in the overall data entry task. The pages are often graphical but are not necessarily so. Typically, each page contains data entry fields of various types (e.g. radio buttons, text entry fields, checkboxes, etc.) and textual instructions describing the actions that should be taken by the user to enter data on the current page. A set of navigational controls is displayed in conjunction with each page to permit the user to traverse the wizard page-by-page. These navigational controls typically comprise four buttons: a "next" button for advancing to the next page of the wizard, a "back" button for going back to a previous page (i.e. backtracking), a "cancel" button for aborting the wizard and a "finish" button for completing the wizard.

In standard operation, upon the occurrence of a triggering event the wizard will be invoked and the first page of the wizard will be displayed. The user interacts with the wizard, by way of a mouse and keyboard for example, to enter any data requested on the first page and, when finished, selects the "next" button to advance to the second page. This process is repeated until all of the wizard's pages have been traversed. If necessary, the user may select the "back" button to review previously entered data or to correct a previous entry. While the wizard's pages are being traversed, the wizard essentially acts a buffer, containing any data entered by the user until the wizard is completed.

When all of the wizard's pages have been traversed and all of the required data entered, the "finish" button will become active. Upon its selection by the user, the wizard is completed, i.e., the UI is exited and the entered data is processed according to the wizard's underlying purpose. The processing associated with wizard completion usually results in the generation of a system product (i.e. a set of one or more system components, such as generated electronic files or amendments to existing files for example, that are created pursuant to the wizard's purpose, but are not merely by-products of the wizard mechanism).

Because the above-described wizard UI only generates the system product upon wizard completion, the correlation between the data entered on any given wizard page and the component(s) of the resultant system product may be unclear to a user. This may be especially true in cases when the number of wizard pages is large or when the system product has many components. Disadvantageously, this uncertainty may negatively impact the user's ability to comprehend the wizard UI and the associated application software.

What is therefore needed is a wizard UI that is capable of providing the user with greater visibility into system product generation during wizard traversal. What is also needed is a system for displaying such a wizard UI. What is additionally needed is a method of developing software to implement such a wizard UI.

SUMMARY OF THE INVENTION

A wizard user interface generates an interim system product during forward traversal of the wizard's pages and causes the generated interim system product to revert (i.e. be restored to a condition associated with a previous wizard page) during backward traversal of the wizard's pages. The wizard user interface allows the generated interim system product to be observed by the user prior to wizard completion.

In accordance with an aspect of the present invention there is provided a method of using a wizard user interface to facilitate generation of a system product, comprising: receiving via the wizard user interface a first set of user preferences relating to the system product; applying the first set of user preferences to create a displayable interim product; later receiving via the wizard user interface a second set of user preferences; and applying the second set of user preferences to modify the displayable interim product.

In accordance with another aspect of the present invention there is provided a wizard user interface for facilitating generation of a system product, comprising: means for receiving via the wizard user interface a first set of user preferences relating to the system product; means for applying the first set of user preferences to create a displayable interim product; means for later receiving via the wizard user interface a second set of user preferences; and means for applying the second set of user preferences to modify the displayable interim product.

In accordance with still another aspect of the present invention there is provided a computer readable medium storing computer software that, when loaded into a computing device, adapts the device to facilitate generation of a system product with a wizard user interface by: receiving via the wizard user interface a first set of user preferences relating to the system product; applying the first set of user preferences to create a displayable interim product; later receiving via the wizard user interface a second set of user preferences; and applying the second set of user preferences to modify the displayable interim product.

In accordance with still another aspect of the present invention there is provided a computing device operable to facilitate generation of a system product with a wizard user interface by: receiving via the wizard user interface a first set of user preferences relating to the system product; applying the first set of user preferences to create a displayable interim product; later receiving via the wizard user interface a second set of user preferences; and applying the second set of user preferences to modify the displayable interim product.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION

Figure 1:
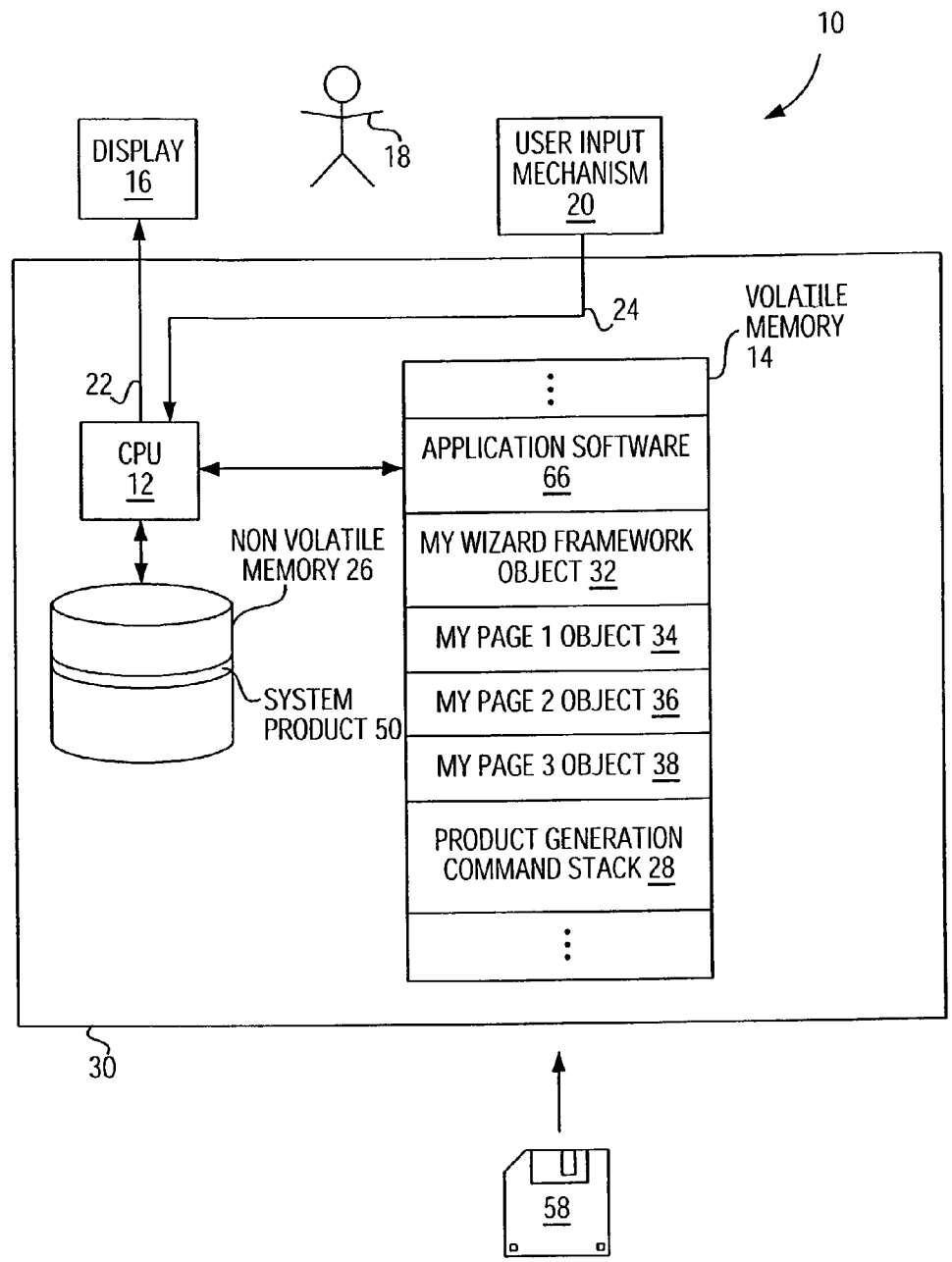
FIG. 1 is a schematic diagram of a computing system capable of displaying a wizard user interface (UI) exemplary of the present invention.

FIG. 1 illustrates an exemplary computing system 10 comprising a computing device 30 executing application software 66 stored in volatile memory 14 (e.g. RAM). The computing device 30, which may be a PC, server or hand-held device for example, includes a CPU 12 in communication with the volatile memory 14 as well as non-volatile memory 26 (e.g. a hard drive). The interconnections between the volatile and non-volatile memories 14 and 26 and the CPU 12 are conventional. A display 16 for displaying a graphical user interface (GUI) to a user 18 and a user input mechanism (UIM) 20 for receiving input from the user 18 are interconnected with the CPU 12 by way of links 22 and 24 respectively. The link 22 may not be a direct connection, and may for example include a video card (not shown) in communication with both the CPU 12 (by way of a system bus) and a monitor (by way of a cable) in a conventional manner. The interconnection of the UIM 20 with the CPU 12 is also conventional and may not be direct.

Display 16 is a conventional display device, such as a CRT, flat-screen monitor or liquid crystal display, capable of presenting a GUI to a user 18. The display 16 may form part of the computing device 30 comprising the computing system 10.

The user input mechanism 20 is a device or devices capable of generating user input representative of commands for operating the application software 66. The UIM 20 may be a keyboard, mouse or touch screen, for example, or a combination of these devices, and may be capable of controlling a movable pointer on the display 16 for interacting with a GUI. The UIM 20 may form part of the computing device 30 which comprises the computing system 10.

The application software 66 is an application which includes executable code for displaying a wizard user interface ("wizard UI" or simply "wizard") capable of interim system product generation and reversion, as will be described herein. In the present embodiment, the application comprises a word processing application. However, in alternative embodiments, the application may be any other type of application that is capable of displaying a wizard with an interim product generation and reversion capability, such as a spreadsheet or a software development tool for example.

The application software 66 (including the portion that implements the wizard UI) is developed using an object oriented language, such a C++ or Java™, and incorporates code from a standard UI class library, such as the Microsoft® Foundation Class library, the Java™ Foundation Class Swing components from SUN® Microsystems ("Swing"), or the Standard Widget Toolkit from IBM® for example. More specifically, two wizard-related classes defined in the included UI class library, namely a, wizard framework class and a wizard page class, are utilised by the wizard UI portion of application software 66 to implement the wizard UI. These two classes provide certain baseline wizard functionality according to a known wizard framework-page paradigm that is characteristic of standard object oriented UI class libraries. As will be described, these two classes (referred to respectively as the "baseline wizard framework class" and "baseline wizard page class", and cumulatively as the "baseline wizard classes") are sub-classed (i.e. have subclasses derived therefrom) and the subclasses are adapted to implement the wizard UI of the present embodiment. The application software 66 may be loaded into the volatile memory 14 of the system 10 from any suitable computer readable medium, such as a removable optical or magnetic disk 58, or from resident non-volatile memory 26 such as a hard drive or a read only memory chip.

In addition to containing the application software 66, the volatile memory 14 of FIG. 1 contains a "my wizard framework" object 32 and three wizard page objects, namely a "my page 1" object 34, "my page 2" object 36 and "my page 3" object 38. These four objects 32, 34, 36 and 38 comprise instantiations of the adapted subclasses referred to above and cumulatively implement the wizard UI of the present embodiment. It is noted that the prefix "my" in the object names denotes the fact that the objects are not instantiations of baseline wizard classes, but rather are instantiated from classes that are derived from a baseline wizard class. It will be appreciated that the objects 32, 34, 36 and 38 only exist in volatile memory 14 at run time.

The volatile memory 14 also contains a product generation command stack data structure 28. The stack 28 is instantiated in volatile memory 14 upon the invocation of the wizard UI. As will be described, any commands that are executed by the wizard for the purpose of generating a system product during forward wizard traversal are pushed onto the stack 28. Upon backward traversal of the wizard, these commands are popped to support the reversion of the generated system product to a previous state. It will be appreciated that the product generation command stack 28 only exists in volatile memory 14 at run time.

The non-volatile memory 26 of FIG. 1 contains a system product 50. The product 50 is generated by the wizard UI (in accordance with the wizard's underlying purpose) as the user 18 advances or backtracks through the wizard's pages, and is reverted if the user 18 backtracks through the wizard's pages. In the present embodiment, the system product 50 has two component files which support the wizard's objective of assisting the user 18 in composing a letter and an associated fax cover page that are being prepared using word processing application software 66. These two component files consist of a letter document and a fax cover page document which implement the user's wizard selections, as will be described in more detail below. The product 50 may persist in non-volatile memory 26 after the wizard UI has been completed; thus, the presence of a product 50 in non-volatile memory 26 indicates that the wizard UI is either presently active or that it has been successfully completed.

Figure 2A:
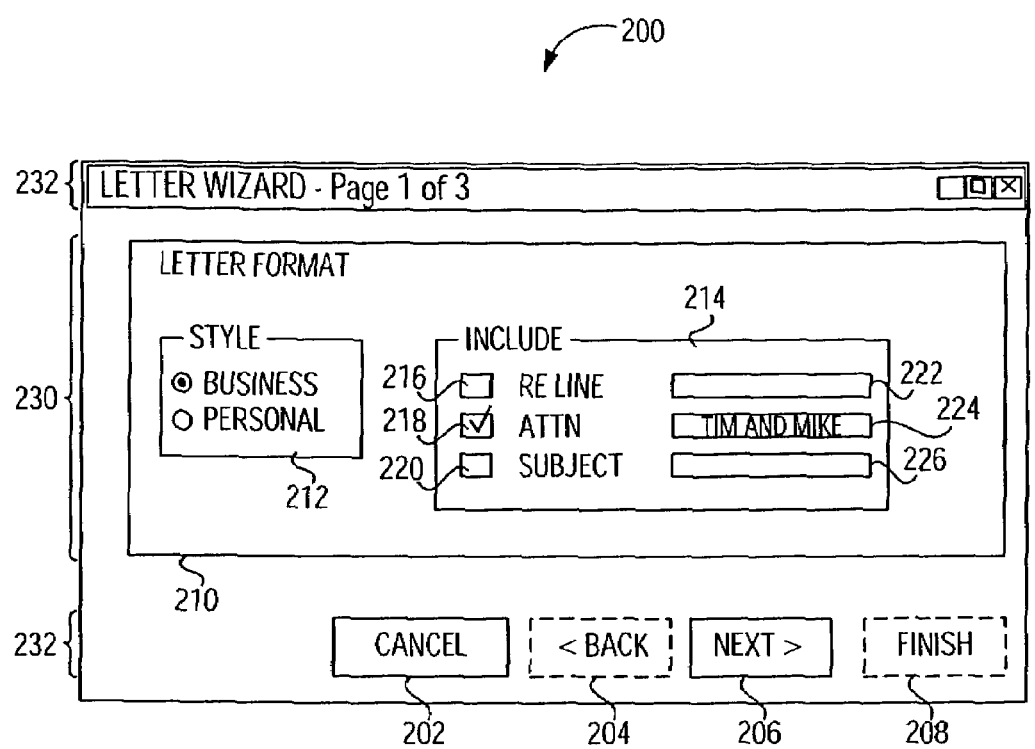
FIG. 2A illustrates a wizard UI generated by the computing system of FIG. 1 displaying a first page of its three pages.
Figure 2B:
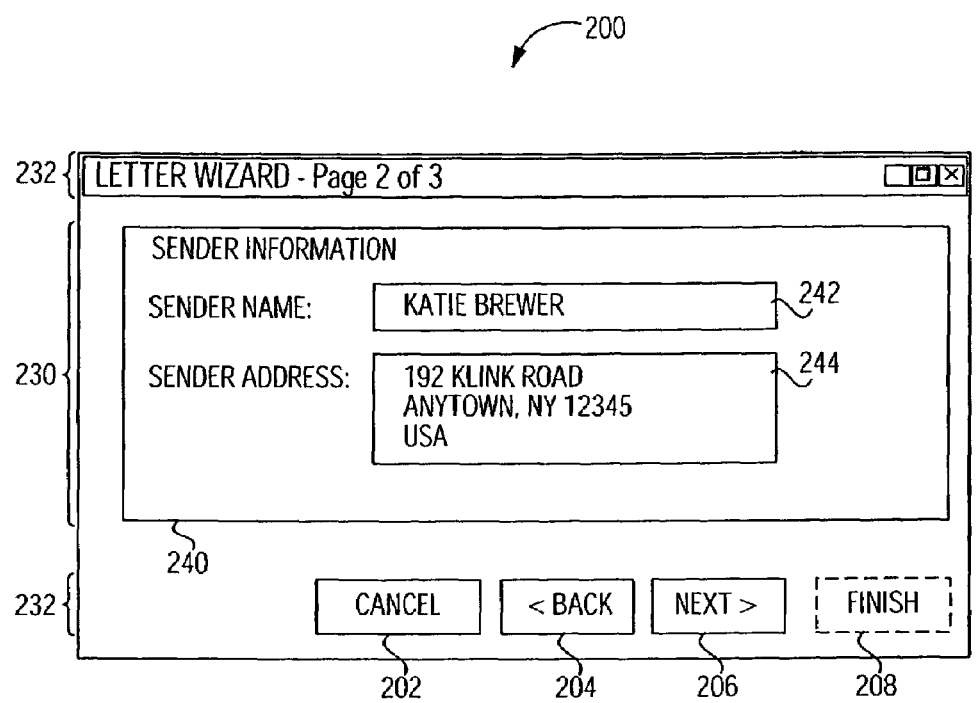
FIG. 2B illustrates the wizard UI of FIG. 2A displaying a second page of its three pages.
Figure 2C:
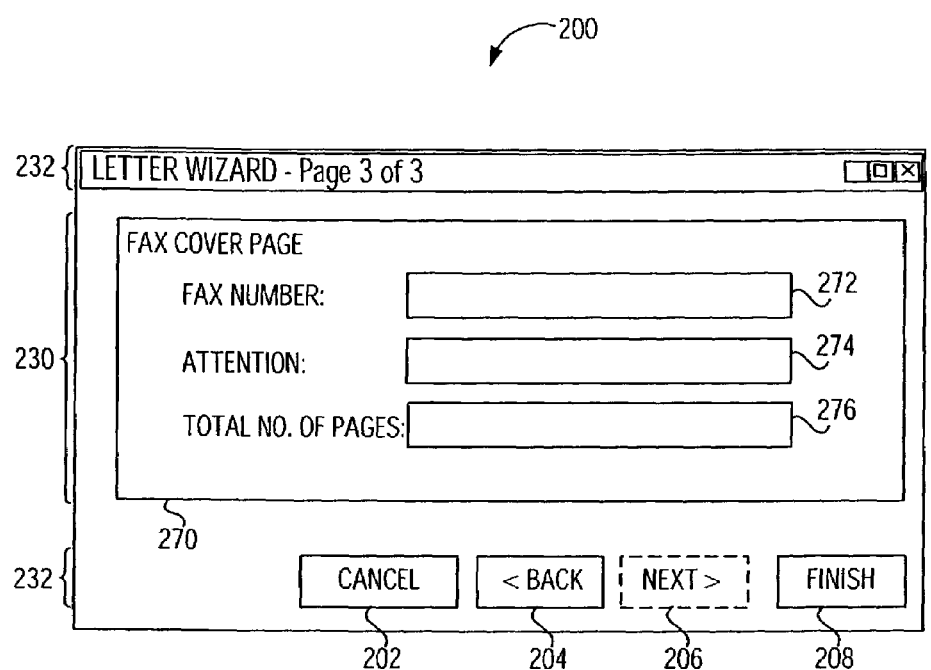
FIG. 2C illustrates the wizard UI of FIG. 2A displaying its third and final page.

Referencing FIGS. 2A, 2B and 2C, a wizard UI 200 generated by the computing system 10 is illustrated. The wizard UI 200 has three pages 210, 240 and 270, which are illustrated in FIGS. 2A, 2B and 2C respectively.

As may be seen in FIG. 2A, the wizard UI 200 is comprised of two sections: a current page section 230 and a wizard frame section 232. The current page section 230 comprises the wizard's currently displayed page, which in the case of FIG. 2A is the wizard's first page 210. The content and appearance of current page section 230 is governed by the page object corresponding to the currently displayed page (e.g. the appearance of the current page section 230 in FIG. 2A is governed by the "my page 1" object 34 of FIG. 1). It will be appreciated that, to the extent that subsequent pages in the wizard differ in content from the first page 210, the appearance of the current page section 230 will change as the user 18 traverses the pages of the wizard UI 200.

The wizard frame section 232 of wizard UI 200 essentially comprises all of the remaining areas of the wizard UI 200 aside from the current page section 230. The wizard framework section 232 thus consists primarily of the title bar at the top of the wizard 200 and the navigational controls at the bottom of the wizard 200. The title bar of the wizard framework section 232 is used in the present embodiment to convey the identity of the current page to the user 18, while the navigational controls permit the user 18 to traverse the wizard page-by-page. It will be appreciated that the appearance of wizard frame section 232 is essentially consistent from page to page (i.e. across FIGS. 2A to 2C), with the exception that the text in the title bar and the active/inactive status of the navigational control buttons may vary. The wizard framework section 232 is governed by the "my wizard framework" object 32 (FIG. 1).

The navigational controls of the wizard framework section 232 comprise a "cancel" button 202, a "back" button 204, a "next" button 206, and a "finish" button 208. In FIG. 2A, the "cancel" and "next" buttons 202 and 206 are active while the "back" and "finish" buttons 204 and 208 are inactive. The active/inactive status of the buttons is indicated by solid and dotted lines, respectively, and is determined largely by the ordinal position of the displayed page in the overall wizard page sequence, as will be familiar to those skilled in the art.

First page 210 (FIG. 2A) contains various user-editable Fields (i.e. data entry form fields, which are referenced herein using the capitalized word "Field", as opposed to class variables, which are referenced herein using the lowercase word "field") for assisting a user 18 with the formatting of a letter document. These Fields include a "Style" radio button Field 212 for selecting a letter style, an "Include" Field 214 comprising checkboxes 216, 218 and 220 for indicating desired lines to be included in the letter, and corresponding text entry Fields 222, 224 and 226 for entering text for the selected lines. Some fields (e.g. 218 and 224) have been edited by the user 18. FIGS. 2B and 2C illustrate the wizard UI 200 with its second and third pages (respectively) being displayed in current page section 230. Second page 240 pertains to sender information to be included in the letter document and thus includes text entry Fields 242 and 244 for entry of a sender's name and address (respectively). These Fields have been edited by the user 18. Third wizard page 270 pertains to the fax cover page document and accordingly includes various text entry fields relevant to a fax cover page, including a fax number Field 272, an "attention" Field 274 and a "total no. of pages" Field 276 respectively.

Figure 3:
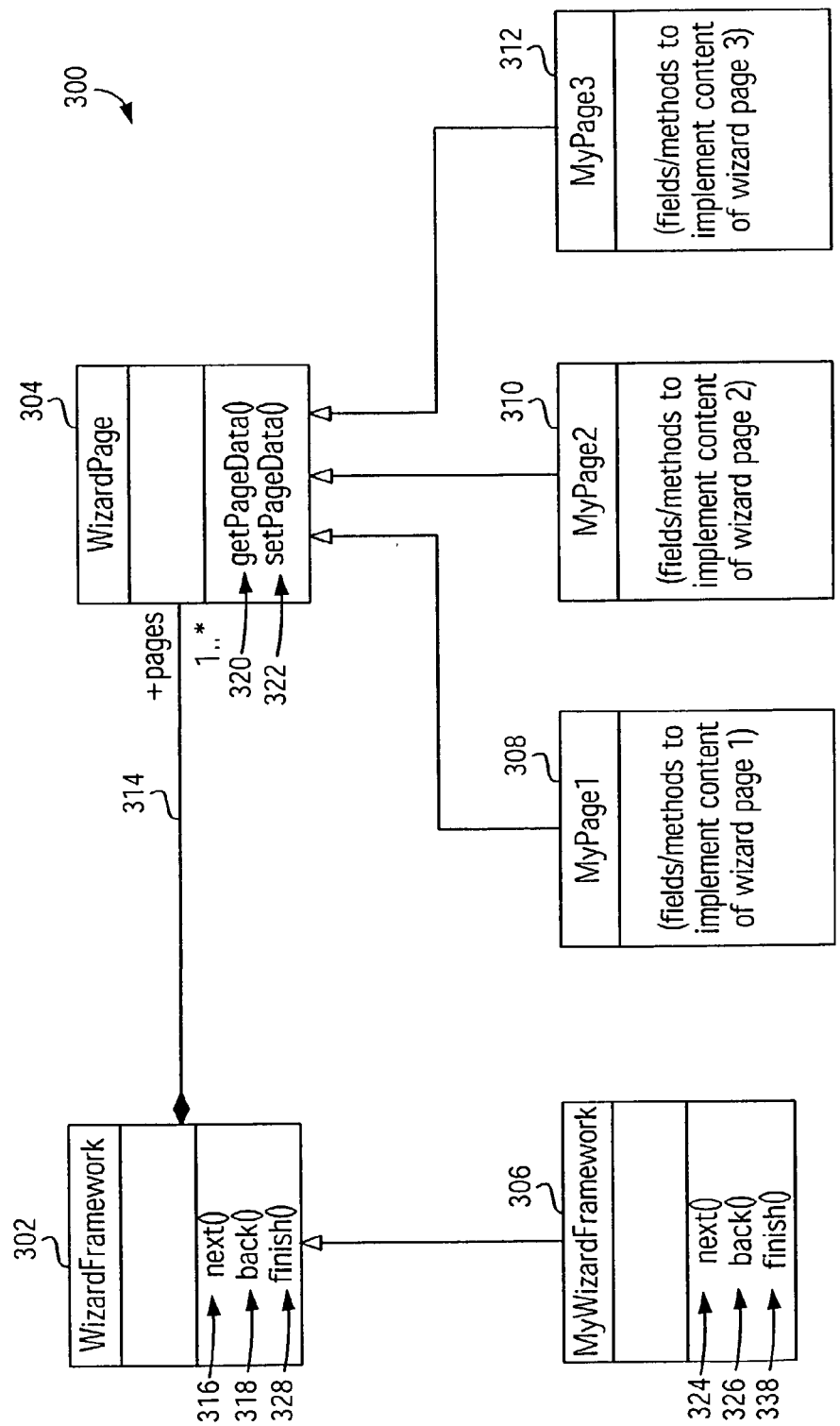
FIG. 3 is a Unified Modeling Language (UML) schema illustrating various classes used to implement the application software of FIG. 1.

Referring now to FIG. 3, a Unified Modeling Language (UML) schema 300 having various wizard-related classes comprising the application software 66 is illustrated. The UML schema 300 follows the standard nomenclature for UML as set out in, for example, Grady Booch, Ivar Jacobsen, James Rumbaugh, "The Unified Modeling Language User Guide", Addison-Wesley, 1999, the contents of which are incorporated herein by reference.

The schema 300 contains two groups of classes: baseline classes and derived classes. Baseline classes include the WizardFramework class 302 and the WizardPage class 304. These classes originate from, and are part of, the standard object oriented UI class library that is utilised by the application software 66. As known by those skilled in the art, classes 302 and 304 are defined according to the known wizard framework-page paradigm that is characteristic of standard object oriented UI class libraries. The baseline classes are not instantiated per se in the application software 66, but rather are used as base classes from which specialised wizard framework and wizard page classes, which comprise the "derived classes" in schema 300, are derived. Baseline classes are identifiable by the lack of the prefix "my" in their class name.

The remaining four classes in schema 300, i.e. MyWizardFramework class 306, MyPage1 class 308, MyPage2 class 310, and MyPage3 class 312, comprise the schema's derived classes. These classes are not part of the standard UI class library, but rather are descendant from either the baseline WizardFramework class 302 or the baseline WizardPage class 304. The derived classes inherit code from their parent classes for implementing certain baseline wizard functionality, such as the displaying of navigational control buttons and the handling of button events for example. Moreover, the derived classes (in particular, the MyWizardFramework class 306) contain additional code to implement the wizard's interim product generation and reversion capability, as will be described. Derived classes are identifiable in schema 300 by the prefix "my" in their class name, which connotes adaptation of the class from its baseline version.

It will be appreciated that various other classes not appearing in FIG. 3 may comprise the schema 300.

Referring first to the baseline classes, WizardFramework class 302 defines the baseline functionality of the wizard UI mechanism. The WizardFramework class 302 includes fields and methods (not illustrated) that are used to implement such baseline wizard capabilities as the displaying of the wizard's navigational control buttons, the handling of button events, the management of the wizard's multiple pages, and maintenance of the identity of the wizard's currently displayed page for example. The WizardFramework class 302 defines a next( ) method 316 that is executed whenever the wizard's "next" button 206 is selected, a back( ) method 318 that is executed whenever the wizard's "back" button 204 is selected, and a finish( ) method 328 that is executed whenever the wizard's "finish" button 208 is selected (it is noted that these methods may have different names in the wizard framework class of different UI class libraries). As will be described, these methods are overridden in the MyWizardFramework class 306 for the purpose of supporting the desired interim product generation and reversion capability of the wizard UI 200. It will be appreciated that no interim product generation and reversion capability is provided by the baseline WizardFramework class 302.

WizardPage class 304 defines the baseline functionality of a wizard page. Like the WizardFramework class 302, the WizardPage class 304 forms part of the utilised standard UI class library. The WizardPage class 304 is subclassed for each of the wizard's pages, with each subclass being adapted (through the addition of various fields and methods) to effect the desired content and layout for that page. The baseline class 304 implements such capabilities as the displaying or hiding of a wizard page for example. The WizardPage class 304 also defines a getPageData( ) method 320 and a setPageData( ) method 322 which provide a mechanism by which wizard page data may be input to a page object or returned from the wizard page object. It will be appreciated that no interim product generation and reversion capability is provided by the baseline WizardPage class 304.

As may be seen in FIG. 3, the WizardPage class 304 and WizardFramework class 302 are associated by way of a composition relationship 314. As understood by those skilled in the art, composition relationship 314 indicates that an instantiation of the WizardFramework class 302 may contain one or more instantiations of the WizardPage class 304. This composition relationship permits a wizard framework object to dynamically access a contained wizard page object's visible methods at run time for such purposes as triggering page operations (e.g. the display of a page) in response to certain events detected at the framework level (e.g. a navigation control button event). It will be appreciated that composition relationship 314 is inherited by the descendants of the WizardFramework class 302 and the WizardPage class 304.

Turning now to the derived classes in schema 300, MyWizardFramework class 306 defines the content and functionality of the wizard framework section 232 of the wizard UI 200. When instantiated at run time, class 306 comprises the "my wizard framework" object 32 (FIG. 1). The class 306 is instantiated once per wizard UI 200. The MyWizardFramework class 306 includes fields and methods inherited from the parent WizardFramework class 302 which define the baseline functionality of the wizard UI mechanism, described above. The MyWizardFramework class 306 further includes code which has been added by a developer to implement the interim product generation and reversion capability described herein. In the present embodiment, the added code comprises an adapted next( ) method 324, adapted back( ) method 326 and adapted finish( ) method 338 which override the default functionality of the methods of the same name (i.e. methods 316, 318 and 328) defined in the parent WizardFramework class 302.

The next( ) method 324 of the MyWizardFramework class 306, which is executed in lieu of next( ) method 316 when the "next" navigational control button 206 of wizard UI 200 is selected, contains code which causes various components of the system product 50 to be generated depending upon the identity of the wizard page that has just been completed (i.e. the page that has just had its "next" button 206 selected). The next( ) method 324 also contains code which causes any commands that have been executed in order to generate a system product component to be captured in the product generation command stack 28, as will be described below.

The back( ) method 326 of the MyWizardFramework class 306, which is executed in lieu of back( ) method 318 when the "back" navigational control button 204 of wizard UI 200 is selected, contains code which, depending upon the identity of the wizard page from which the user has just backtracked, may cause one or more components of the generated system product 50 to be reverted. To this end, the back( ) method 326 contains code which causes the most recently executed command to be popped from the product generation command stack 28 so that it may be "undone", as will also be described.

The finish( ) method 338 of the MyWizardFramework class 306, which is executed in lieu of finish( ) method 328 when the "finish" navigational control button 208 of wizard UI 200 is selected, contains code which causes the finalised version system product to be generated based on any existing interim product and the data that has been entered on the final page 270 of the wizard UI 200. The finish( ) method 338 also contains code which causes the product generation command stack 28 to be de-allocated upon wizard completion.

With respect to the derived page classes of the wizard UI 200, the MyPage1 class 308 is adapted to define the content and functionality of the wizard UI's first page 210 (FIG. 2A). When instantiated, the MyPage1 class 308 comprises the "my page 1" object 34 (FIG. 1). The MyPage1 class 308 includes fields and methods inherited from the WizardPage class 304 which define the baseline functionality of a wizard page, including the getPageData( ) and setPageData( ) methods described previously. As will be appreciated by those skilled in the art, the latter two methods are adapted to implement a wizard page data input and output mechanism that is suited to the first wizard page 210.

The MyPage2 class 310 and MyPage3 class 312 are analogous to the MyPage1 class 308, defining the content and functionality of the wizard's second and third pages 240 and 270 (FIGS. 2B and 2C) respectively. When instantiated, classes 310 and 312 comprise the "my page 2" object 36 and the "my page 3" object 38 in the system's volatile memory 14 (FIG. 1). Like the MyPage1 class 308, MyPage2 class 310 and MyPage3 class 312 each inherit the getPageData( ) and setPageData( ) methods from wizard page class 304. These methods are adapted in each class to implement a wizard page data input and output mechanism that is suited to the wizard page in question.

Figure 4:
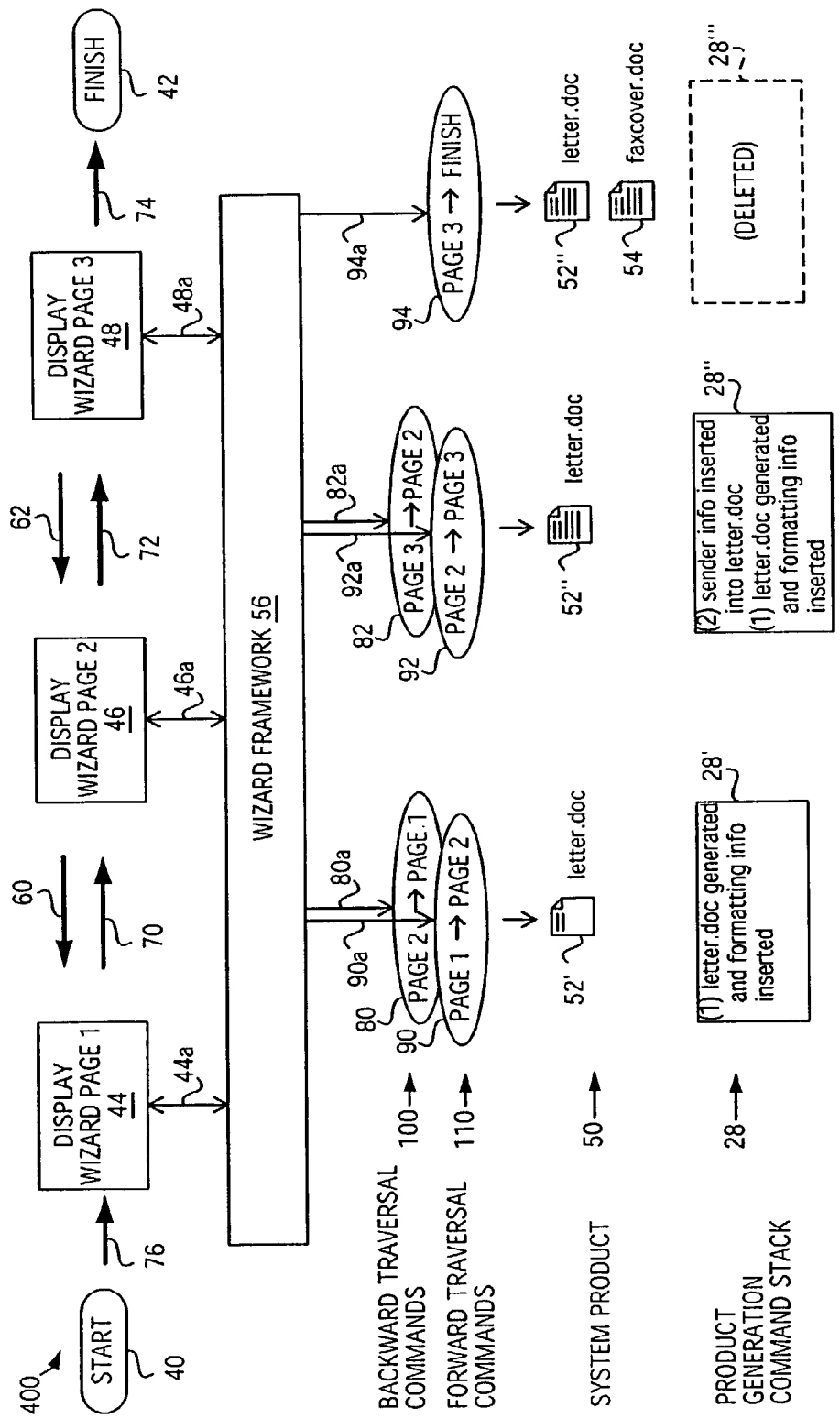
FIG. 4 is a state diagram illustrating the execution of the wizard UI of FIGS. 2A–2C along with the system product and product generation command stack that are generated at various stages of wizard traversal.

FIG. 4 is a state diagram illustrating the traversal of wizard UI 200 along with the system product 50 and product generation command stack 28 that are generated at various stages of wizard traversal. FIG. 4 includes a wizard page sequence 400 which is a state diagram representing the traversal of wizard UI 200 from invocation to completion. The sequence 400 is made up of five states comprising three wizard page display states 44, 46 and 48 (illustrated as blocks) and two non wizard page display states 40 and 42 (illustrated as flowchart terminators). The three wizard page display states 44, 46 and 48 represent the system 10 displaying the first, second and third wizard page 210, 240 and 270 respectively. The two non wizard page display states "start" 40 and "finish" 42 represent the system prior to wizard invocation and following wizard completion respectively.

A series of state transition arrows 60, 62, 70, and 72 are interposed between the wizard page display states 44, 46 and 48. These arrows represent transitions of the system 10 from the display of one wizard page to another wizard page. More specifically, left-pointing state transition arrows 60 and 62 indicate backward wizard page traversal while right-pointing state transition arrows 70 and 72 indicate forward wizard page traversal. A further state transition arrow 76 interposed between the "start" state 40 and the first wizard page display state 44 represents the invocation of the wizard UI 200 after the occurrence of the wizard's triggering event. Another state transition arrow 74 interposed between the third wizard page display state 48 and the "finish" state 42 represents completion of the wizard UI 200 through selection of the "finish" button 208.

It will be appreciated that no left-pointing state transition arrows are interposed between the "start" state 40 and the first wizard page display state 44 or between the third wizard page display state 48 and "finish" state 42 in FIG. 4. This is because neither backward traversal from wizard page 1 to the "start" state 40 nor backward traversal from the "finish" state 42 to wizard page 3 is defined.

FIG. 4 further includes a wizard framework block 56 representative of the wizard framework object (i.e. "my wizard framework" object 32) which exists throughout the execution of most of wizard page sequence 400. The double-headed arrows 44a, 46a and 48a between wizard framework block 56 and the wizard page display states 44, 46 and 48 respectively represent data intercommunication (i.e. transfer of wizard page data) occurring between the "my wizard framework" object 32 and the wizard page objects corresponding with the three wizard page states 44, 46 and 48 (i.e. objects 34, 36 and 38 of FIG. 1, respectively). This data intercommunication supports system product generation and is achieved in the present embodiment through invocation of the getPageData( ) and setPageData( ) methods of the system's "my page objects" 34, 36 and 38, as will be described.

Also included in FIG. 4 are various command icons 80, 82, 90, 92 and 94. Each of these icons represents a command that is invoked by the "my wizard framework" object 32 at a certain stage of wizard traversal for the purpose of either generating or reverting a system product (or components thereof). The commands comprise two groups: forward traversal commands 110 (representing commands that are executed during forward traversal of the wizard UI 200 to generate one or more system product components) and backward traversal commands 100 (representing commands that are executed during backward wizard traversal to cause one or more interim system product components to revert). Forward traversal commands 110 comprise icons 90, 92, and 94 while backward traversal commands 100 comprise icons 80 and 82.

The commands 80, 82, 90, 92 and 94 are interconnected with the wizard framework block 56 by way of arrows 80a, 82a, 90a, 92a and 94a respectively. This interconnection reflects the fact that the invocation of these commands during wizard traversal is triggered by the "my wizard framework" object 32. Each command and arrow pair 80, 80a; 82, 82a; 90, 90a; 92, 92a; and 94, 94a is aligned below a state transition arrow 60, 62, 70, 72 or 74 to reflect the stage in the wizard's traversal at which the command is invoked. Forward traversal commands are understood to be associated with a single forward traversal (represented by a right-pointing state transition arrow) while backward traversal commands are understood to be associated with a single backward traversal (represented by a left-pointing state transition arrow). For example, because forward traversal command 90 is aligned below right-pointing state transition arrow 70, it is understood that the command 90 is executed upon forward traversal from wizard page 1 to wizard page 2 (this fact is also reflected in the text "Page 1→Page 2" within command icon 90). Similarly, because backward traversal command 80 is aligned below left-pointing traversal arrow 60, it is understood that that the command 80 is executed upon backward traversal from wizard page 2 to wizard page 1 (this fact is also reflected in the text "Page 2→Page 1" within the command bubble 80).

It will be appreciated that forward traversal commands 110 and backward traversal commands 100 that are aligned with opposing state transitions between the same two states of wizard page sequence 400 (e.g. commands 80 and 90, or commands 82 and 92) are complementary (i.e. opposite) in terms of their effect on the interim system product.

Further included in FIG. 4 is the system product 50 which exists at various stages in the wizard's traversal. In the present embodiment, the system product 50 comprises two component files "lefter.doc" and "faxcover.doc" which are generated when the wizard's purpose of assisting the user 18 in composing a letter and an associated fax cover page is effected. More specifically, the product 50 comprise two instances 52' and 52" of the electronic "lefter.doc" file component and one instance 54 of the "faxcover.doc" file component. The instances 52' and 52" represent the "letter-.doc" component at different points in the wizard page sequence 400 and are different in content (as will be described). Each component instance 52', 52" and 54 is understood to be associated either with a forward traversal only, or with both a forward traversal and a backward traversal between the same two states. This association is discernable from the state transition arrows with which a component instance is aligned. For example, because the first instance 52' of the "letter.doc" system product is aligned below both state transition arrows 60 and 70, it is understood that that this instance will exist either after a forward traversal from wizard page 1 to wizard page 2 or a backward traversal from wizard page 2 to wizard page 1. As another example, because the instance 54 of the "faxcover.doc" component is aligned below state transition arrow 74 only, it is understood that that this instance will exist only upon wizard completion.

First "letter.doc" instance 52' contains formatting instructions and text which implement the user's selections from the first wizard page 210 (FIG. 2A). In the present case, the instructions/text included in instance 52' are for formatting the "letter.doc" file as a business letter (based on the user's selection of the "business" button in Field 212 of FIG. 2A) and for the inclusion of an "attn" line in the letter (based on the user's entries in Fields 218 and 224). The precise instructions/text that are necessary to effect these user selections are application and platform dependent.

Second instance 52" of the "letter.doc" component contains formatting instructions and text which cumulatively implement the user's selections from the first and second wizard pages 210 and 240 (FIG. 2B). In the present embodiment, instance 52" thus includes all of the instructions included in instance 52' as well as instructions for the inclusion of the sender's information of Fields 242 and 244 into the "letter.doc" component.

The single instance 54 of the "faxcover.doc" component contains instructions/text which implement a fax cover page in accordance with the user's selections from the third wizard page 270.

The product generation command stack 28 illustrated in FIG. 4 is a stack data structure containing a "history" of the commands that have been executed by the system 10 during the current wizard UI session to generate the currently-existing system product 50. For every forward wizard traversal (not including state transition 76), a representation of an executed system product generation command is pushed onto the stack and, for every backward wizard traversal, a representation of a previously-executed system product generation command is popped from the stack. In the present embodiment, this pushing/popping occurs even in the event that no system product components are generated or reverted during a particular traversal. In the latter case, the representation that is pushed onto/popped from the stack 28 will be a "no-op" code which indicates that no generation/reversion command has been executed for the associated traversal. Such "no-op" codes (which are not utilized in the present embodiment) may be used as place-holders in the stack 28 to ensure proper system product generation/reversion.

In the present embodiment, the command representations that are pushed onto/popped from the stack 28 comprise machine-readable codes that represent the system's executed product generation commands. In the various instances 28', 28" of FIG. 4, however, these codes are represented in the form of textual entries which describe the effect of the represented commands (for the sake of clarity).

FIG. 4 includes three instances 28', 28" and 28''' of the product generation command stack 28. Each instance is aligned below at least one state transition arrow to reflect the stage in the wizard's traversal at which the instance will be in existence. As with the various instances 52', 52" and 54 of the system product components, each instance is understood to be associated with the state transition arrow(s) with which it is aligned, regardless of whether the alignment is with a forward traversal only or with both a forward and a backward traversal.

The first instance 28' of the product generation command stack 28 contains a first entry "letter.doc generated and formatting info inserted". This entry indicates that, at this stage of wizard traversal, the electronic file "letter.doc" has been created by the UI 200 in non-volatile memory 26 and has been edited to insert instructions and text to implement the user's selections from the first wizard page 210 (FIG. 2A).

Second instance 28" contains a second entry "sender info inserted into letter.doc" in addition to the first entry described above. The second entry indicates that, at this later stage of wizard traversal, the electronic file "letter.doc" has been edited to include instructions/text to implement the sender information contained in the second wizard page 240 (FIG. 2B). The positioning of the second entry above the first entry in the instance 28" of FIG. 4 reflects the stack's LIFO structure.

Third instance 28''' of the product generation command stack 28, which is illustrated below the state transition arrow 74 in FIG. 4 in dotted outline, is not an instance per se, but rather merely indicates that the product generation command stack 28 is deleted upon wizard completion.

Figure 5:
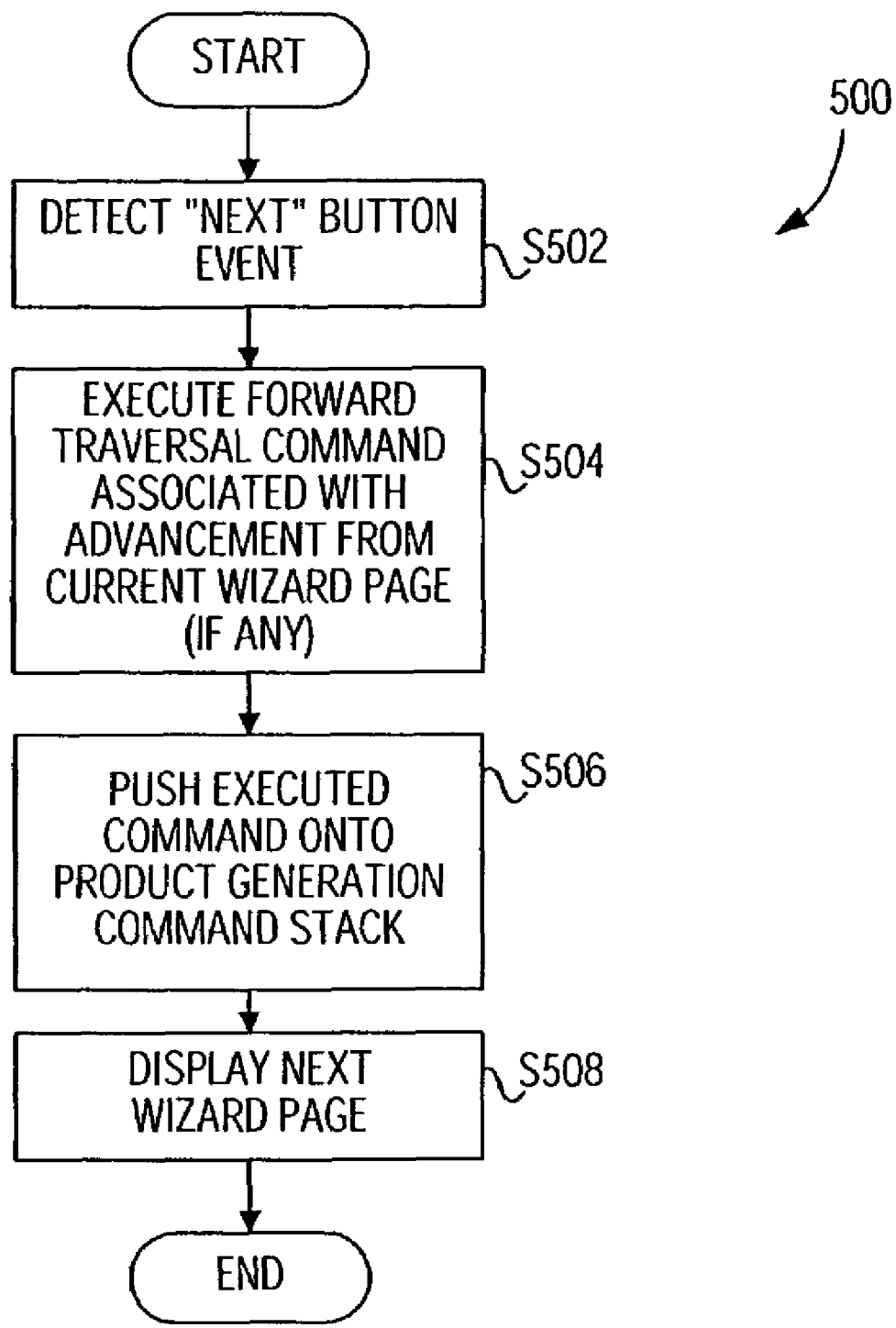
FIG. 5 illustrates a flowchart of steps executed by the computing system of FIG. 1 when a wizard page's "next" button is selected.
Figure 6:
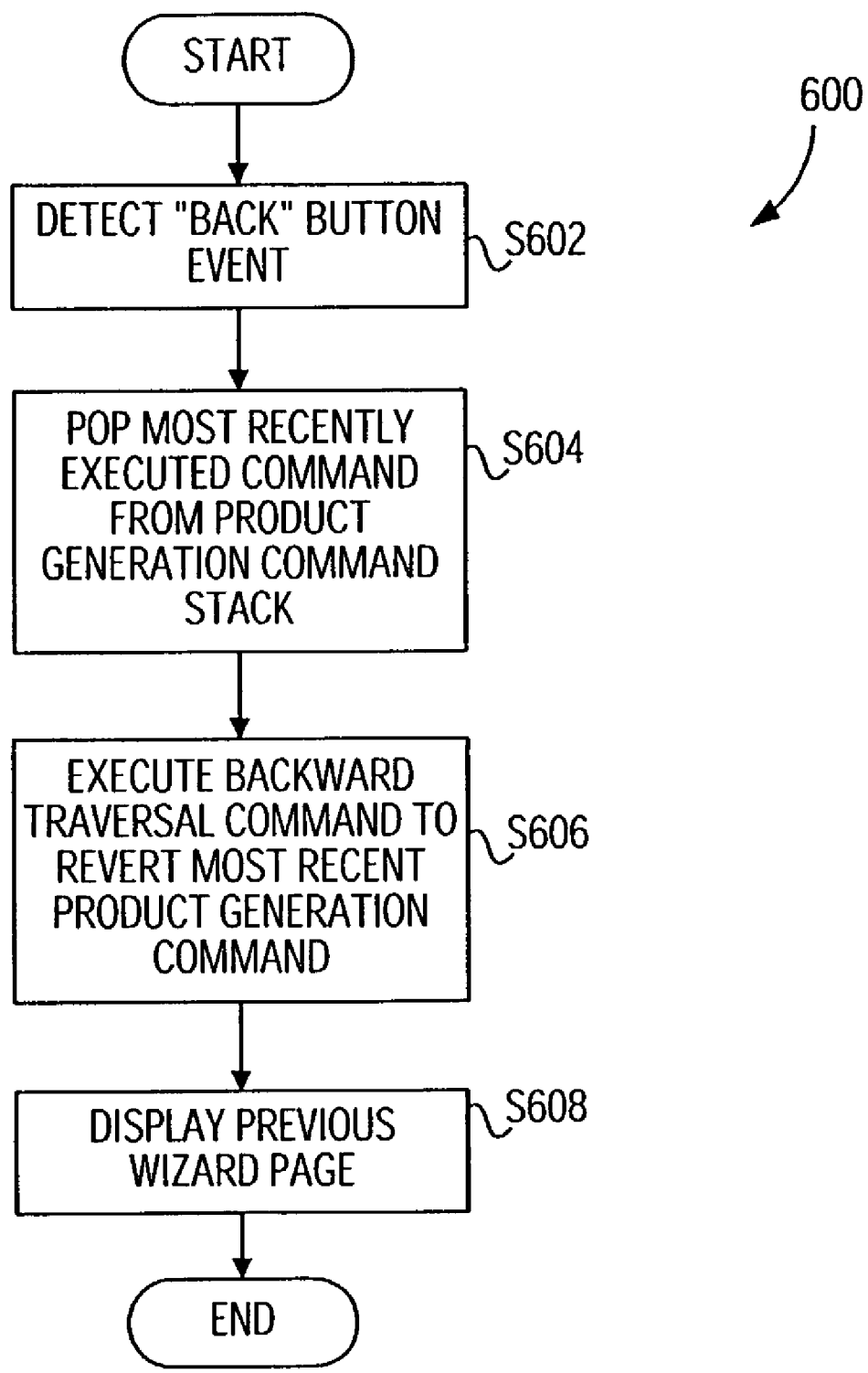
FIG. 6 illustrates a flowchart of steps executed by the computing system of FIG. 1 when a wizard page's "back" button is selected.
Figure 7:
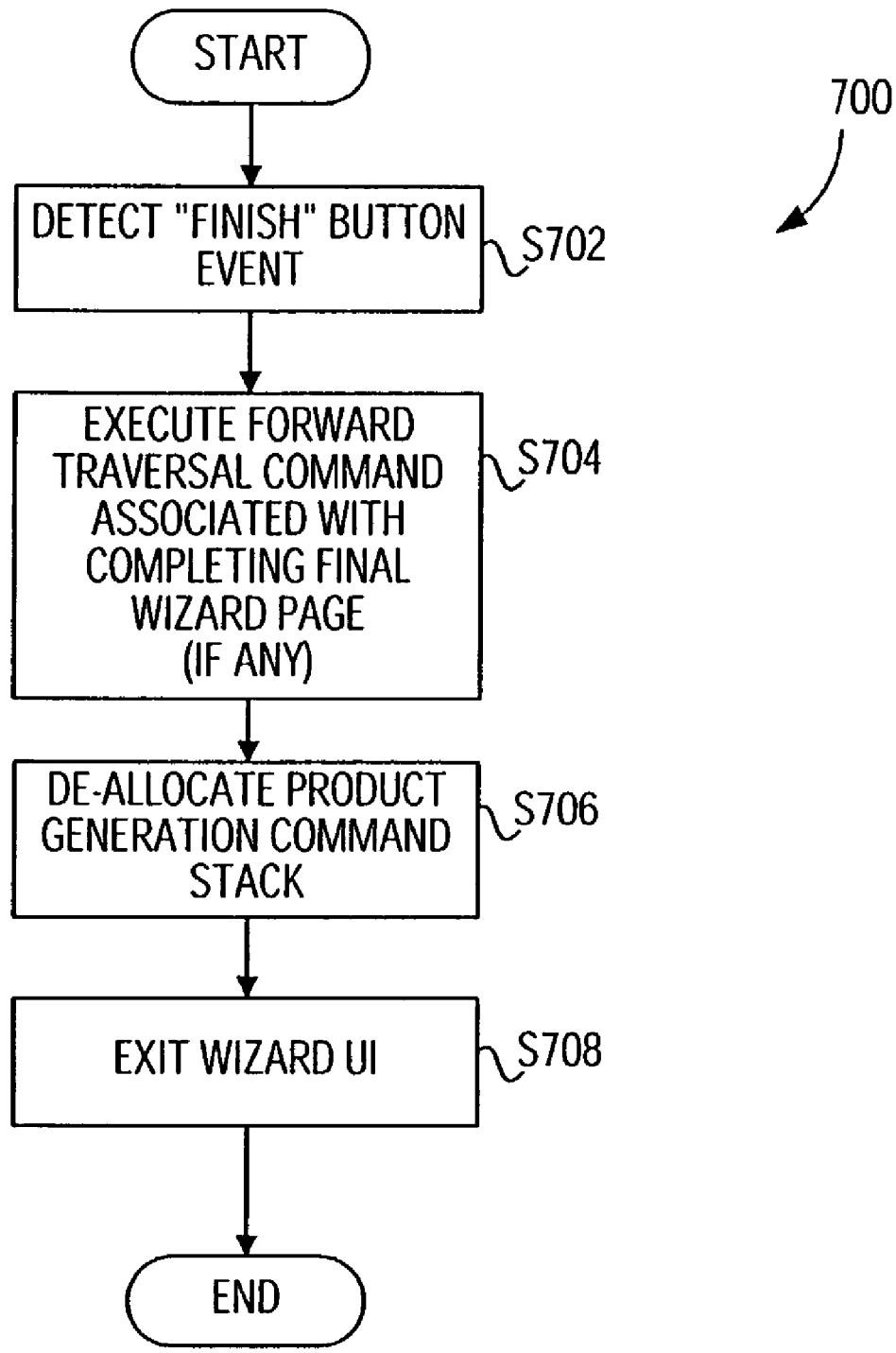
FIG. 7 illustrates a flowchart of steps executed by the computing system of FIG. 1 when the wizard's "finish" button is selected.

The operation of the present embodiment is illustrated in the flowchart of steps 500, 600 and 700 of FIGS. 5–7, with additional reference to FIGS. 1, 2A–2C, 3, and 4. Steps 500 illustrate the operation of the computing system 10 upon the selection of the "next" button 206 of the wizard UI 200; steps 600 illustrate the operation of the computing system 10 upon the selection of the "back" button 204; and steps 700 illustrate the operation of the computing system 10 upon the selection of the "finish" button 208.

With respect to steps 500, it is initially assumed that the triggering event associated with the wizard has occurred, and that the first page 210 of the wizard UI 200 has accordingly been displayed to a user 18 on the display 16 of the computing system 10 (FIG. 1). In other words, the state of the system 10 is assumed to have been advanced from the "start" state 40 to the first wizard page display state 44 (FIG. 4). This of course entails the instantiation of the "my wizard framework" object 32 as well as "my page 1" object 34, "my page 2" object 36, and "my page 3" object 38, in volatile memory 14 (FIG. 1). Additionally, the display of wizard UI 200 causes an as-yet empty product generation command stack 28 to be created in volatile memory 14.

In response to the display of the first wizard page 210, the user 18 utilizes UIM 20 to enter data in Fields 212 and 214 as illustrated in FIG. 2A and, when finished, selects the "next" button 206 to advance to the next wizard page. The user's selection of the "next" button 206 is detected within the "my wizard framework" object 32 in step S502 and, as a result, the next( ) method 324 (FIG. 3) is invoked.

Upon its invocation, the next( ) method 324 determines the identity of the currently displayed page to be wizard page 1 (by way of baseline fields/methods inherited from class 302) and, based on this determination, executes a branch of code which causes forward traversal command 90 (FIG. 4) to be executed in step S504. Command 90 may be hard-coded in the MyWizardFramework class 306. Alternatively, a hash table or similar construct that has been loaded during initialization of the "my wizard framework" object 32 may be used to identify command 90 as the proper command to be executed based on the identity of the current wizard page and the fact that a forward traversal is imminent (the latter method providing greater flexibility than hard-coding, as the commands to be executed may be changed without requiring the software 66 to be recompiled). The execution of forward traversal command 90 in turn causes the "letter.doc" component 52' (FIG. 4) to be generated in non-volatile memory 26 which, as described previously, contains instructions/text to implement the user's selections from first wizard page 210. It will be appreciated that this generation of the component instance 52' entails the invocation of the getPageData( ) method of the "my page 1" object 34 for the purpose of retrieving wizard page data associated with the first wizard page 210. Moreover, it will also be appreciated that the command 90 (and for that matter, all of the other commands 100 and 110) may in fact comprise a number of sub-commands.

Subsequently, in step S506, a representation of the executed command (comprising the text "letter.doc generated and formatting info inserted" in FIG. 4) is pushed onto the product generation command stack 28, to indicate that the "letter.doc" component has been created and that the data entered by the user 18 on the first wizard page 210 has been written thereto. The resultant product generation command stack is the instance 28' illustrated in FIG. 4. Finally, in step S508, the next wizard page (i.e. second wizard page 240) is displayed through invocation of the appropriate baseline method(s) of WizardFramework class 302. Thus, the state of the system 10 is advanced from first wizard page display state 44 to second wizard page display state 46 (FIG. 4).

At this stage, control reverts to the wizard UI mechanism, which displays the second wizard page 240 and awaits input from the user 18. It will be appreciated the interim system product (comprising generated component instance 52') is now observable by the user 18. To observe the component 52' in the present embodiment, the user 18 shifts the wizard UI to the background and invokes a file management utility in the appropriate system directory which reveals the fact that the system product "letter.doc" has been created. Moreover, if it is desired to inspect the contents of component 52', the user 18 invokes a word processing application with the instance 52' comprising the input file (it is noted that modification of the instance 52' may even be possible by way of the processor's editing capabilities, however some types of modification, such as the changing of a filename for example, are not advisable as they may compromise the proper functioning of the system 10). These actions are possible in the present embodiment because the wizard UI 200 is implemented as a modeless window which, as known by those skilled in the art, is capable being shifted in the background while other applications or processes are executed in the foreground. Advantageously, the user's capacity to observe the created system component 52' and to inspect its contents provides the user 18 with a better appreciation of the effect of his/her entries on first wizard page 210.

Next, the user 18 utilizes UIM 20 to enter data in Fields 212 and 214 of second wizard page 240 as illustrated in FIG. 2B and, when finished, selects the "next" button 206 to advance to the next wizard page. This selection of the "next" button 206 is detected in "my wizard framework" object 32 in step S502 and again results in the invocation of its next( ) method 324 (FIG. 3).

Upon its invocation, the next( ) method again executes code to determine the identity of the currently displayed page (wizard page 2) and, based on this determination, executes a branch of code which causes forward traversal command 92 (FIG. 4) to be executed in step S504 (with command 92 again being either hard-coded or determinable by way of a hash table lookup, as described with reference to command 90). The execution of forward traversal command 92 in turn causes the existing "letter.doc" component 52' to be amended in non-volatile memory with further instructions/text for implementing the user's selections from second wizard page 240, thus creating new instance 52".

Thereafter, in step S506, a second command representation (comprising the text "sender info inserted into letter.doc" in FIG. 4) is pushed onto the product generation command stack 28 to indicate that the "sender" data entered by the user 18 on second wizard page 240 has in fact been captured in the "letter.doc" file component 52". The resultant product generation command stack is the instance 28".

Finally, the next wizard page (i.e. third wizard page 270) is displayed through the invocation of baseline code inherited from WizardFramework class 302 in step S508. Thus the state of the system 10 is advanced from second wizard page display state 46 to third wizard page display state 48 (FIG. 4).

At this stage, control once again reverts to the wizard UI mechanism, which displays the third wizard page and awaits input from the user 18. The current system product 50 (comprising "lefter.doc" component instance 52") is now again observable by the user 18 by way of the system's file management utility and word processing application, which may be invoked while the modeless window of wizard UI 200 is shifted to the background, as previously described. Advantageously, observation of the current instance 52" permits the user 18 to better appreciate the effect of his/her entries on second wizard page 240.

At this point, the user 18, wishing to verify that the data entered on second wizard page 240 was correct, utilizes UIM 20 to select the "back" button 204. This selection of the "back" button 204 is detected in "my wizard framework" object 32 in step S602 (FIG. 6) and results in the invocation of that object's back( ) method 326 (FIG. 3).

Upon its invocation, the back( ) method 326 pops the representation of the most recently executed product generation command (i.e. entry (2) of instance 28") from the product generation command stack 28 in step S604, thus causing the state of the product generation command stack 28 to return to the state represented by instance 28'. Based on the popped representation, the back( ) method 326 then executes a branch of code which causes the backward traversal command 82 (FIG. 4) to be executed in step S606, so that the "letter.doc" component is reverted from instance 52" to previous instance 52'. As with forward traversal commands 90 and 92, command 82 may either be hard-coded or determinable by way of a hash table lookup. As a result, any instructions/text that were based on the user-entered data on second wizard page 240 are deleted from the "letter.doc" system component, such that the only instructions/text that are left in the "letter.doc" component is those pertaining to the implementation of first wizard page 210. Finally, the previous wizard page (i.e. second wizard page 240) is displayed in step S608 (i.e. the state of the system 10 is transitioned from the third wizard page display state 48 back to the second wizard page display state 46 of FIG. 4).

It will be appreciated that, following the execution of step S608, the state of the wizard UI 200 as well as its associated system product 50 (now comprising instance 52' of the "letter.doc" component) and product generation command stack 28 are now the same as they were following the completion of the first wizard page 210 during the initial forward traversal of the wizard page sequence 400.

At this stage, control once again reverts to the wizard UI mechanism, which displays the second wizard page 240 and awaits input from the user 18. The current system product 50 (i.e. instance 52' of the "letter.doc" component) is now again observable by the user 18 in the manner described previously. Advantageously, observation of the instance 52' may permit the user 18 to better appreciate the effect of his/her entries on second wizard page 240, based on identification by the user 18 of the product that have now been reverted.

Subsequently, the user 18 again advances to the third wizard page display state 48 using the previously described procedure, and the third wizard page 270 is displayed accordingly. This time, the user 18 enters data into the Fields of page 270 to implement the desired fax cover page document and selects the "finish" button 208 to complete the wizard. The selection of the "finish" button 208 is detected in "my wizard framework" object 32 in step S702 (FIG. 7) and results in the invocation of its finish( ) method 338 (FIG. 3).

The finish( ) method 338 executes a branch of code which causes forward traversal command 94 (FIG. 4) to be executed in step S704. The execution of forward traversal command 94 causes the "faxcover.doc" system component 54 to be generated in non-volatile memory 26, with instructions and text being written thereinto to implement the user's selections from third wizard page 270. In other words, execution of the step S704 results in the generation of the final system product 50 (comprising finalised components 52" and 54). Thereafter, the product generation command stack 28 is de-allocated in step S706 (as indicated by dotted line instance 28'''), and the wizard UI 200 is finally exited in step S708.

In summary, it will be appreciated that the capacity of the system 10 to cause an interim system product to be generated and reverted during wizard traversal as described herein provides the user 18 with a better appreciation of the effect of his/her entries on the various pages of wizard UI 200. Moreover, the well-known user tendency of using software without consultation of online help or documentation is effectively leveraged to support accelerated software comprehension.

It will be appreciated that the described wizard UI 200 is implemented in accordance with the Model View Controller (MVC) paradigm. As known by those skilled in the art, this paradigm dictates that external world modeling, substantive user input, and feedback to the user should each be handled by way of a separate "Model" component, "View" component, and "Controller" component respectively.

In the present case, the "Model" component is implemented by way of the stack 28, which contains a history of the commands that have been executed by the wizard to implement the currently-existing system product 50 which models the desired "real world" word processing documents. The "View" component is implemented by way of the three "my wizard page" objects 34, 36 and 38, which are responsible for the retrieval of substantive user input. Finally, the "controller" component is implemented by way of the "my wizard framework" object 32, which is responsible for invoking the forward or backward traversal commands 110 and 100 that result in the generation of the system product 50, the existence of which provides the user 18 with feedback regarding the creation of the desired word processing documents.

The advantage of an MVC-compliant implementation of the instant wizard UI may best be understood in the context of the updates that are required if it is desired to modify the system 10 to generate an interim system product in a different sequence than described above. For example, if it is desired to generate the "letter.doc" component in its "final" form (i.e. in the form represented by instance 52" of FIG. 4) following the completion of the second wizard page 240 (rather than first generating instance 52' after the completion of the first wizard page 210 and then amending instance 52' to create instance 52" after the completion of the second wizard page 240), the only class that requires updating is the MyWizardFramework class 306. In particular, the desired update may be implemented by combining the invocation of forward traversal command 90 with the invocation of forward traversal command 92 and for this combined invocation to occur upon forward traversal from wizard page 2 to wizard page 3 (i.e. at state transition 72 of FIG. 4). That is, the next( ) method 324 of the MyWizardFramework class 306 would need to amended to "do nothing" when the user advances from wizard page 1 to wizard page 2 (at which time a "no-op" code, described previously, would be written to the product generation command stack 28) and to implement the final "letter.doc" system component 52" when the user advances from wizard page 2 to wizard page 3. It is noted that, in this case, it would likely also be desirable to combine backward traversal commands 80 and 82 for execution upon backward traversal from wizard page 3 to wizard page 2, so that the capacity for system product reversion would be preserved in view of this change. Advantageously, because the present embodiment is MVC paradigm compliant, it is not necessary to update any of the classes MyPage1 308, MyPage2 310 or MyPage3 312 to implement this change, thus software maintainability is supported.

It is of course possible to implement the system 10 in such a way that MVC paradigm compliance is not achieved, but that the desired interim system product generation and reversion capability is still present. However, in this case the maintainability of the system 10 may suffer. For example, if the invocations 80a, 82a, 90a, 92a and 94a (FIG. 4) of the various forward and backward traversal commands 110 and 100 was performed by "my wizard page" objects 32, 34 and 36 rather than by the "my wizard framework" object 32, the desired interim system product generation and reversion capability may still be present. However, implementation of the above-described change to the system would necessitate updates to both MyPage1 class 308 and MyPage2 class 310 (rather than just a single update to WizardFramework class 302). In cases where the number of affected wizard pages is large, the maintenance required for such system changes as a result of non-compliance with the MVC paradigm may be particularly onerous.

As will be appreciated by those skilled in the art, modifications to the above-described embodiment can be made without departing from the essence of the invention. For example, although the described embodiment relies on an external file management utility and a word processing application to enable the user 18 to observe the generated interim product, in alternative embodiments this capability may be made internal to the application software 66 (e.g. software 66 may have an integrated system product display feature).

As well, though the system 10 is described as storing the interim and final versions of the generated system product 50 in non-volatile memory 26, alternative embodiments may use volatile memory 14 for this purpose. In such embodiments, use of an integrated system product display feature may be necessary in place of the present embodiment's modeless window approach, so that the generated system product 50 may be accessed in volatile memory 14.

Also, it is not necessary for the system product (or components thereof) to be generated only upon advancing the wizard UI to a next page or backtracking to a previous page. Specialised wizard controls, such as a "Generate Product" button or a "Revert Product" button on one or more wizard pages, may be implemented within any page of the wizard UI 200 to effect product generation or reversion without the traversal of any wizard pages.

Fundamentally, the wizard UI 200 need not be developed using wizard-related classes from a standard UI class library and need not be developed in an object oriented programming language. A non-object oriented programming language implementation of a wizard UI adhering to the above-described behaviour may be developed without the use of any predefined wizard-related components.

Other modifications will be apparent to those skilled in the art and, therefore, the invention is defined in the claims.

The embodiments of the invention in which an exclusive property or privilege is claimed are defined as follows:

1. A method of using a wizard user interface to facilitate dynamically installing a system software product, comprising:
   receiving via the wizard user interface a first set of user preferences relating to the system software product;
   applying the first set of user preferences to create a displayable interim product;
   later, after applying the first set of user preferences, receiving via the wizard user interface a second set of user preferences;
   applying the second set of user preferences to modify the displayable interim product; and then
   finally receiving a user completion indication to accept the applied user preferences; and
   completing the system software product installation based on the accepted user preferences.

2. The method of claim 1, further comprising:
   before receiving the user completion indication, subsequently receiving via the wizard user interface a user indication to unapply the second set of user preferences; and
   causing the displayable interim product to revert to a state prior to the applying of the second set of user preferences.

3. The method of claim 2, further comprising:
   after creating the displayable interim product, displaying the displayable interim product;

after modifying the displayable interim product, displaying the displayable interim product; and after causing the displayable interim product to revert, displaying the displayable interim product.

4. The method of claim 2, further comprising:

after creating the displayable interim product, allowing user interaction with the displayable interim product;

after modifying the displayable interim product, allowing user interaction with the displayable interim product; and after causing the displayable interim product to revert, allowing user interaction with the displayable interim product.

5. The method of claim 2, further comprising:

saving the displayable interim product after each applying step and after the causing step.

6. The method of claim 2, wherein the receiving step and the later receiving step occurs upon forward wizard traversal.

7. The method of claim 2, wherein the subsequently receiving step occurs upon backward wizard traversal.

8. The method of claim 2, wherein each applying step comprises recording an indication of a system software product generation command.

9. The method of claim 8, wherein the causing step comprises reading a recorded indication of a system software product generation command.

10. The method of claim 9, wherein the recording step comprises pushing the indication of a system software product generation command onto a stack data structure and wherein the reading step comprises popping the recorded indication of a system product generation command from the stack data structure.

11. The method of claim 2, wherein the wizard user interface comprises a wizard framework object instantiated from an adapted wizard framework class and wherein the wizard user interface complies with the Model View Controller paradigm.

12. A wizard user interface for facilitating dynamic installation of a system software product, comprising:

means for receiving via the wizard user interface a first set of user preferences relating to the system software product;

means for applying the first set of user preferences to create a displayable interim product;

means for later, after applying the first set of user preferences, receiving via the wizard user interface a second set of user preferences;

means for applying the second set of user preferences to modify the displayable interim product;

means for, after modifying the displayable interim product, finally receiving a user completion indication to accept the applied user preferences; and means for completing the system software product based on the second user preferences.

13. The wizard user interface of claim 12, further comprising:

means for, before receiving the user completion indication, subsequently receiving via the wizard user interface a user indication to unapply the second set of user preferences; and means for causing the displayable interim product to revert to a state prior to the applying of the second set of user preferences.

14. The wizard user interface of claim 13, further comprising:

means for, after creating the displayable interim product, displaying the displayable interim product;

means for, after modifying the displayable interim product, displaying the displayable interim product; and means for, after causing the displayable interim product to revert, displaying the displayable interim product.

15. The wizard user interface of claim 13, further comprising:

means for, after creating the displayable interim product, allowing user interaction with the displayable interim product;

means for, after modifying the displayable interim product, allowing user interaction with the displayable interim product; and means for, after causing the displayable interim product to revert, allowing user interaction with the displayable interim product.

16. The wizard user interface of claim 13, further comprising:

means for saving the displayable interim product after each applying step and after the causing step.

17. The wizard user interface of claim 13, wherein the receiving step and the later receiving step occurs upon forward wizard traversal.

18. The wizard user interface of claim 13, wherein the subsequently receiving step occurs upon backward wizard traversal.

19. The wizard user interface of claim 13, wherein each applying step comprises recording an indication of a system software product generation command.

20. The wizard user interface of claim 19, wherein the causing step comprises reading a recorded indication of a system software product generation command.

21. The wizard user interface of claim 20, wherein the recording step comprises pushing the indication of a system software product generation command onto a stack data structure and wherein the reading step comprises popping the recorded indication of a system software product generation command from the stack data structure.

22. A computer program product comprising a computer readable medium storing a computer readable program that, when executed by a computing device, causes the computing device to facilitate dynamic installation of a system software product with a wizard user interface by:

receiving via the wizard user interface a first set of user preferences relating to the system software product;

applying the first set of user preferences to create a displayable interim product;

after applying the first set of user preferences, later receiving via the wizard user interface a second set of user preferences;

applying the second set of user preferences to modify the displayable interim product; and then finally receiving a user completion indication to accept the applied user preferences; and completing the system software product based on the accepted user preferences.

23. The computer program product of claim 22, further capable of causing the computing device to facilitate generation of a system software product with a wizard user interface by:

before receiving the user completion indication, subsequently receiving via the wizard user interface a user indication to unapply the second set of user preferences; and causing the displayable interim product to revert to a state prior to the applying of the second set of user preferences.

24. The computer program product of claim 23, further capable of causing the computing device to facilitate generation of a system software product with a wizard user interface by:
  after creating the displayable interim product, displaying the displayable interim product;
  after modifying the displayable interim product, displaying the displayable interim product; and
  after causing the displayable interim product to revert, displaying the displayable interim product.

25. The computer program product of claim 23, further capable of causing the computing device to facilitate generation of a system software product with a wizard user interface by:
  after creating the displayable interim product, allowing user interaction with the displayable interim product;
  after modifying the displayable interim product, allowing user interaction with the displayable interim product; and
  after causing the displayable interim product to revert, allowing user interaction with the displayable interim product.

26. The computer program product of claim 23, further capable of causing the computing device to facilitate generation of a system software product with a wizard user interface by:
  saving the displayable interim product after each applying step and after the causing step.

27. The computer program product of claim 23, wherein the receiving step and the later receiving step occurs upon forward wizard traversal.

28. The computer program product of claim 23, wherein the subsequently receiving step occurs upon backward wizard traversal.

29. The computer program product of claim 23, wherein each applying step comprises recording an indication of a system software product generation command.

30. The computer program product of claim 29, wherein the causing step comprises reading a recorded indication of a system software product generation command.

31. The computer program product of claim 30, wherein the recording step comprises pushing the indication of a system software product generation command onto a stack data structure and wherein the reading step comprises popping the recorded indication of a system software product generation command from the stack data structure.

32. A computing device operable to facilitate dynamic installation of a system software product with a wizard user interface by:
  receiving via the wizard user interface a first set of user preferences relating to the system software product;
  applying the first set of user preferences to create a displayable interim product;
  later, after applying the first set of user preferences, receiving via the wizard user interface a second set of user preferences;
  applying the second set of user preferences to modify the displayable interim product; and then
  finally receiving a user completion indication to accept the applied user preferences; and
  completing the system software product based on the accepted user preferences.

33. The device of claim 32, further operable to facilitate generation of a system software product with a wizard user interface by:
  before receiving the user completion indication, subsequently receiving via the wizard user interface a user indication to unapply the second set of user preferences; and
  causing the displayable interim product to revert to a state prior to the applying of the second set of user preferences.

34. The device of claim 33, further operable to facilitate generation of a system software product with a wizard user interface by:
  after creating the displayable interim product, displaying the displayable interim product;
  after modifying the displayable interim product, displaying the displayable interim product; and
  after causing the displayable interim product to revert, displaying the displayable interim product.

35. The device of claim 33, further operable to facilitate generation of a system software product with a wizard user interface by:
  after creating the displayable interim product, allowing user interaction with the displayable interim product;
  after modifying the displayable interim product, allowing user interaction with the displayable interim product; and
  after causing the displayable interim product to revert, allowing user interaction with the displayable interim product.

36. The device of claim 33, further operable to facilitate generation of a system software product with a wizard user interface by:
  saving the displayable interim product after each applying step and after the causing step.

37. The device of claim 33, wherein the receiving step and the later receiving step occurs upon forward wizard traversal.

38. The device of claim 33, wherein the subsequently receiving step occurs upon backward wizard traversal.

39. The device of claim 33, wherein each applying step comprises recording an indication of a system software product generation command.

40. The device of claim 39, wherein the causing step comprises reading a recorded indication of a system software product generation command.

41. The device of claim 40, wherein the recording step comprises pushing the indication of a system software product generation command onto a stack data structure and wherein the reading step comprises popping the recorded indication of a system software product generation command from the stack data structure.

* * * * *